May 6, 1924.

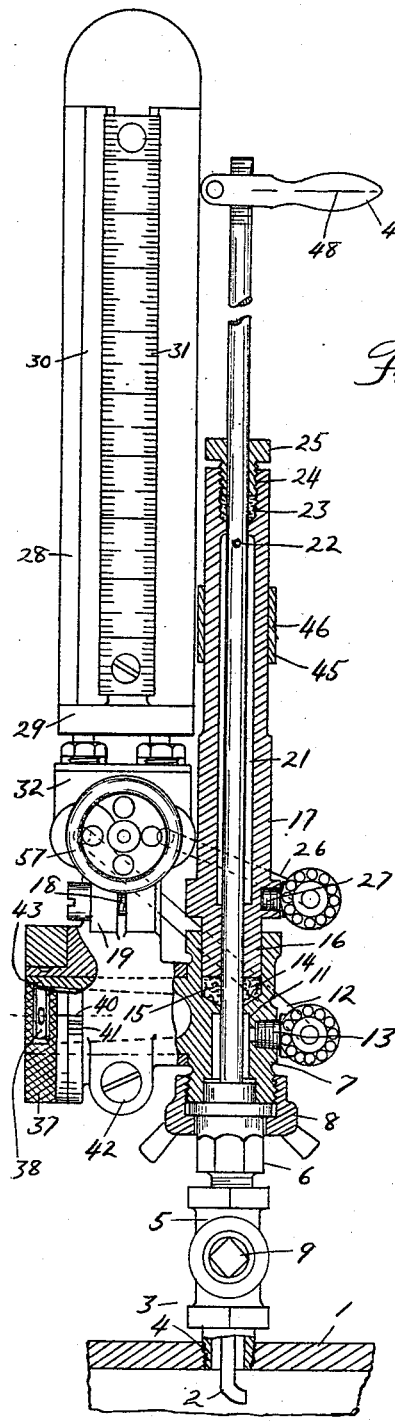

L. D. ROYER 1,492,939

FLOW INDICATOR

Filed Sept. 27, 1920    2 Sheets-Sheet 2

Inventor
Lloyd D. Royer

By Whittemore Hulbert & Whittemore
Attorneys

Patented May 6, 1924.

UNITED STATES PATENT OFFICE.

1,492,939

LLOYD D. ROYER, OF DETROIT, MICHIGAN, ASSIGNOR, BY MESNE ASSIGNMENTS, TO CHAS. CORY & SON, INC., OF NEW YORK, N. Y.

FLOW INDICATOR.

Application filed September 27, 1920. Serial No. 412,995.

*To all whom it may concern:*

Be it known that I, LLOYD D. ROYER, a citizen of the United States of America, residing at Detroit, in the county of Wayne and State of Michigan, have invented certain new and useful Improvements in Flow Indicators, of which the following is a specification, reference being had therein to the accompanying drawings.

The invention relates to flow indicators and has for one of its objects the provision of an indicator which may be adjustably swung from the horizontal position to vary the sensitiveness thereof. Another object is to provide means for universally adjusting the indicating member. A further object is to provide a support for the indicating member, which support is adapted to carry the indicating member with the latter extending substantially parallel to the longitudinal axis of the support, or extending transversely thereof. Other objects of the invention reside in the novel features of construction and arrangements of parts as more fully hereinafter set forth.

In the drawings:

Figure 1 is a sectional top plan view of a flow indicator embodying my invention;

Figure 2 is a side elevation thereof, partly in section, and with parts broken away;

Figures 3, 4:
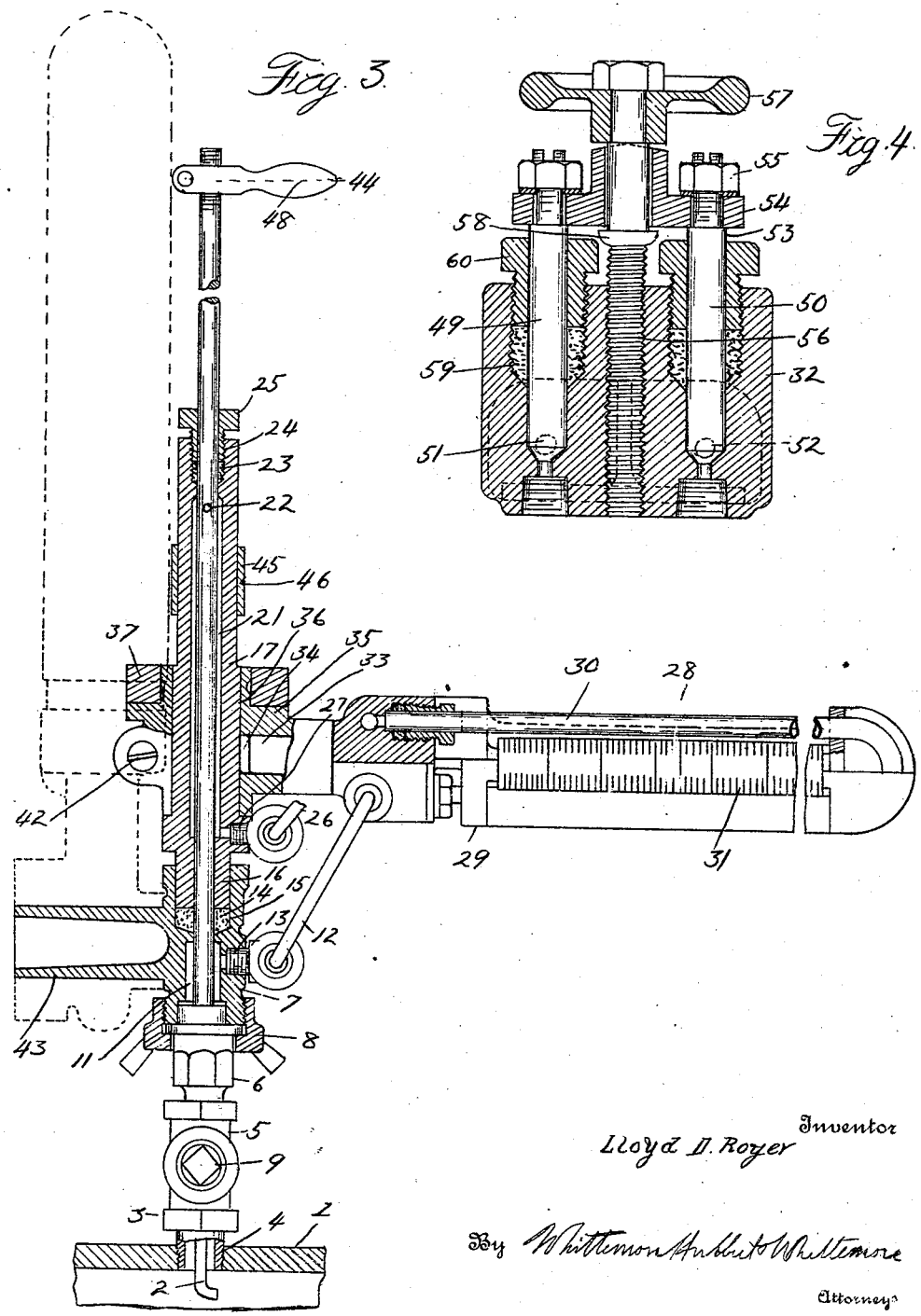
Figure 3 is a sectional top plan view showing the indicating member carried upon the support in another position from that shown in Figure 1.
Figure 4 is a cross-section on the line 4—4 of Figure 2.

1 is the conduit through which the fluid is passing, 2 is the dynamic tube which extends into the conduit, and 3 the static chamber which communicates with the interior of the conduit. This static chamber comprises the nipple 4, the valve body 5 engaging the nipple, the outer nipple 6 engaging the valve body and the support 7 secured to the outer end of the outer nipple by means of the thumb nut 8. 9 is a valve, in the present instance a plug valve, which is adapted to close the passage-way through the valve body.

The dynamic tube 2 is adapted to pass through the aperture 10 of the valve and passes longitudinally through the support 7, the outer nipple 6 and the inner nipple 4, the passage-ways through these members being of sufficient diameter to permit of inserting or removing the dynamic tube. The passageway through the support 7 is of such a diameter as to form a chamber 11 therewithin surrounding the dynamic tube. 12 is a suitable flexible tube, which is preferably armored, and connects into the chamber 11 by means of the nipple 13 threadedly engaging the wall of the support 7. For sealing the joint between the dynamic tube and the support beyond the chamber 11, suitable packing 14 is provided within the recess 15 at the outer end of the support. This packing is retained in place by means of the bushing 16 surrounding the dynamic tube and preferably integral with the dynamic chamber member 17, also surrounding the dynamic tube and secured to the support 7 by means of the stud bolts 18, extending through the adjacent flanges 19 upon the support and 20 upon the dynamic chamber member. The internal diameter of the dynamic chamber member is such that a chamber 21 is formed between this member and the dynamic tube 2, which latter has the aperture 22 in its wall for placing the interior of the tube in communication with the chamber. 23 is packing in the recess 24 at the outer end of the chamber member for sealing the joint between the dynamic tube and chamber member. This packing is retained in place by means of the gland nut 25 threadedly engaging in the recess 24. 26 is a suitable flexible tube, which is preferably armored, and connects into the dynamic chamber 21 by means of the nipple 27 threadedly engaging in the wall of the dynamic chamber member 17.

28 is the indicating member or gauge, which comprises the body 29 carrying the U-shaped transparent tube 30 and the scale 31 extending parallel and adjacent to the legs of the U. The ends of these legs extend into the chamber portion 32 of the body and communicate with the flexible tubes 12 and 26. The body 29 has the cylindrical pivot portion 33 at its inner end, which fits in the bore 34 of the slope head 35 to permit of rotation of the indicating member or gauge transversely of its longitudinal axis. The slope head 35 has the bore 36, the axis of which extends transversely of the longitudinal axis of the indicating member or gauge. Rotatably mounted upon the outer end of the slope head is the slope-adjusting collar 37, which is provided with the level 38 and has the set-screw 39 for securing the same to the slope head to prevent relative rotation therebetween. The slope-adjusting collar has the indication 40 on its periphery and extending to its inner face, which is adapted to cooperate with the indications 41 upon the periphery of the slope head 35 extending to its outer face. To adjust the angle of the indicating member or gauge 28 relative to a horizontal plane, the slope head 35 is rotated relative to the slope-adjusting collar 37 to register the desired mark of the indications 41 with the indication 40 and then the set-screw 39 is tightened down to prevent further relative rotation. The indicating member or gauge is then swung downwardly, thereby rotating the slope-adjusting member until the bubble in the level 38 indicates that the latter is horizontal. The slope head is then tightened upon its pivot by means of the screw 42 extending through the adjacent flanges on opposite sides of the split in the slope member.

As shown particularly in Figures 1 and 2, the indicating member or gauge 28 has its longitudinal axis extending substantially parallel to that of the support. In detail, the support 7 has the transversely-extending pivot portion 43 upon which the slope head 35 is sleeved, while as shown in Figure 3, the longitudinal axis of the indicating member or gauge extends transversely of that of the support. In this instance, the slope member is mounted upon the dynamic chamber member 17. With this arrangement the indicating member or gauge can be alternatively placed in either of two positions, depending upon the obstacles, such as conduits, etc., adjacent to the conduit 1.

It is essential in flow indicators to locate the nozzle end of the dynamic tube at the mean velocity point of the conduit through which the fluid is flowing and with this in view, the dynamic tube 2 is arranged to be longitudinally adjustable. As shown, 44 is a handle secured to the outer end of the dynamic tube 2 beyond the dynamic chamber member 17. By loosening the stud bolts 18 and the gland nut 25, the dynamic tube can be longitudinally moved to the desired position, after which the stud bolts and gland nut are tightened. To assist in determining the location of the nozzle at the inner end of the dynamic tube, the collar 45 is provided sleeved upon the dynamic chamber member 17 beyond the slope head 35. This collar has a suitable indication 46, which is positioned at a predetermined distance from the inner end of the valve body 5 and is secured in place by means of a set screw 47. The handle 44 also has a suitable indication 48, which is so positioned with respect to the indication 46 upon the collar 45 that the distance between these indications may be readily secured or measured.

As shown in Figure 4, the legs of the U-shaped tube 30 may be closed from communicating with the flexible tubes 12 and 26. In detail, 49 and 50 are valves extending downwardly into the chamber portion 32 of the body 29 and adapted to close the bores 51 and 52 respectively, each leading to a leg of the U tube. The valve stems have the shoulders 53 at their outer ends against which is secured the yoke 54 by means of the nuts 55 threadedly engaging the outer ends of the valve stems, there being a clearance between the reduced portions of the valve stems and the walls of the apertures in the flange 54 through which they pass to permit yoke to pivot, closing or opening valves evenly. 56 is a stud threadedly engaging the chamber member 32 between the valve stems and to which is secured the handle 57. The flange 54 is clamped between the handle 57 and the shoulder 58 upon the stud 56. For sealing the joint between the valve stems and the chamber portion, suitable packing 59 is provided secured in place by means of the gland nuts 60. By rotating the handle 57 the valves 49 and 50 can be either moved inwardly or outwardly together to close or open communication between the flexible tubes 12 and 26 and the legs of the U tube 30.

From the above description it will be readily seen that I have provided a construction of flow indicator in which the indicating member or gage can be readily varied from horizontal to secure the desired degree of sensitiveness and at the same time can be rotated about its longitudinal axis to secure the same height of indicating liquid in each of the legs of the U-tube. Furthermore, the indicating member or gage may be alternatively secured to the support upon the conduit to extend in the same direction as that of the support or transversely thereof, depending upon the desired position or different obstructions adjacent to the conduit at the point for measuring the flow of the fluid. Another important consideration is the arrangement whereby the position of the nozzle at the inner end of the dynamic tube can be predeterminedly varied. Still further, communication of the conduit with the dynamic and static chambers in the support can be closed or communication between the dynamic and static chambers and the legs of the U-tube can be closed independent of the closing means for the first-mentioned communication.

The members 5, 6, 7 and 17 may be considered the main body of the instrument, adapted to be secured to the pipe 1 and providing a support or base on which the indicator, identified as a unit by numeral 28, is capable of being mounted for adjustment in the plane of its own longitudinal axis in relation to the main body, and also for adjustment by rotation about its axis; and the indicator as a whole is moreover arranged for connection to the main body in at least two different positions, that is to say, on at least two different axes in relation to the main body, and for adjustment of the axial position of the indicator about each of those axes, and also for adjustment of the indicator by rotation about its own axis in either of its principal mounting locations.

What I claim as my invention is:

1. In a flow indicator, the combination with a conduit, of a support mounted thereon having a dynamic chamber and a static chamber in communication with said conduit, an indicating member rotatably secured to said support and having a U-shaped transparent tube, and flexible tubes connecting said static chamber to one of the legs of the U-shaped member and said dynamic chamber to the other of the legs of said U-shaped member.

2. In a flow indicator, the combination with a conduit, of a support mounted thereon and having a static chamber and a dynamic chamber in communication therewith, means for placing said static chamber in communication with said conduit, and a dynamic tube longitudinally movable through said dynamic and static chambers and said static communicating means, said dynamic tube communicating with said dynamic chamber.

3. In a flow indicator, the combination with a conduit, of a support mounted thereon and having a static chamber and a dynamic chamber in communication therewith, means for placing said static chamber in communication with said conduit, a dynamic tube longitudinally movable through said dynamic and static chambers and said static communicating means, said dynamic tube communicating with said dynamic chamber, a valve for closing communication between said static chamber and conduit, said valve having a passageway therethrough adapted to permit of the longitudinal movement of said dynamic tube therethrough.

4. In a flow indicator, the combination with a conduit, of a support mounted thereon having dynamic and static chambers, means for placing said static chamber in communication with said conduit, a dynamic tube longitudinally movable within said support and extending into said conduit, said dynamic tube communicating with said dynamic chamber, a collar secured upon said support at a predetermined distance from said conduit, and a handle upon said dynamic tube beyond said support and cooperating with said collar for locating the position of the inner end of said dynamic tube with respect to said conduit.

5. In a flow indicator, the combination with a conduit, of a support mounted thereon, a slope head rotatably adjustably mounted upon said support, an indicating member upon said slope head, a slope adjusting collar rotatably adjustably mounted upon said slope head and provided with a level, and cooperating indications upon said head and collar for determining the angular relation of the longitudinal axis of said indicating member relative to a horizontal plane.

6. In a flow indicator, the combination with a conduit, of a support mounted thereon having dynamic and static chambers, a slope head rotatably adjustably mounted upon said support, an indicating member extending transversely of the longitudinal axis of said slope head and mounted thereon to be rotatable transversely of the longitudinal axis of said indicating member, means for connecting said dynamic and static chambers to said indicating member, a slope-adjusting collar rotatably adjustably mounted upon said slope head and having a level, and cooperating indications upon said slope head and slope-adjusting collar for determining the angular relation of the longitudinal axis of said indicating member relative to a horizontal plane.

7. In a flow indicator, the combination with a conduit, of a support mounted thereon having a dynamic chamber and a static chamber in communication with said conduit, a slope head rotatably mounted upon said support, an indicating member secured to said slope head to be rotatable in a plane transverse to the plane of rotation of said slope head, and flexible tubes connecting said indicating member with said dynamic and static chambers, said support provided with transversely-extending pivot portions adapted to alternatively receive said slope head.

8. In a flow indicator, the combination with a conduit, of a substantially horizontally-extending support mounted thereon, an indicating member upon said support and rotatable therearound in a substantially vertical plane, and means for positioning said indicating member with its longitudinal axis in predetermined angular relation to the horizontal.

9. In a flow indicator, the combination with a conduit, of a substantially horizontally-extending support mounted thereon, an indicating member upon said support and rotatable therearound in a substantially vertical plane, a level rotatably adjustably mounted upon said support and rotatable in a substantially vertical plane, and means cooperating with said level for positioning said indicating member with its longitudinal axis in predetermined angular relation to the horizontal.

10. In a flow indicator, the combination with a conduit, of a support mounted thereon, an indicating member upon said support and rotatable therearound, said indicating member having parallel tubular portions and an intermediate tubular portion connecting their ends, and means for placing one of said tubular portions in communication with said conduit.

11. In a flow indicator, the combination with a conduit, of a support mounted thereon, a U tube mounted upon said support and movable therearound, and means for placing said U tube in communication with said conduit.

12. In a flow indicator, the combination with a conduit, of a support mounted thereon having chambers in communication with said conduit, a rotatable slope head carried by said support, and an indicating member secured to said slope head and communicating with the chambers in said support, said support being provided with transversely extending pivot portions for alternatively receiving said slope head.

13. In a flow indicator, the combination with a conduit, of a support mounted thereon having chambers in communication with said conduit, a U-shaped transparent tube carried by said support, and flexible tubes connecting one of said chambers to one of the legs of said tube and the other of said chambers to the other of the legs of said tube.

14. In a flow indicator, the combination with a conduit, of a support mounted thereon and having a static chamber and a dynamic chamber in communication therewith, means for placing said static chamber in communication with said conduit, a tube longitudinally movable through said dynamic and static chambers and said static communicating means, said tube communicating with said dynamic chamber, and means for closing communication between said static chamber and conduit.

15. In a flow indicator, the combination with a conduit, of a support mounted thereon provided with chambers, means for placing one of said chambers in communication with said conduit, a tube longitudinally movable within said support and extending into said conduit, said tube communicating with one of said chambers, a member secured upon said support at a predetermined distance from said conduit, and means upon said tube beyond said support and cooperating with said member for locating the position of the inner end of said tube with respect to said conduit.

16. A flow indicator comprising a main body adapted for mounting upon a pipe and including a static chamber and a dynamic chamber and a dynamic tube arranged for insertion into the pipe and for fluid connection with the dynamic chamber, an indicating unit, means for connecting said unit to the main body so that it may be adjusted and secured in different axial positions in relation to the main body, and provision for fluid connection between the indicator and the static and dynamic chambers in any of the adjusted positions of the indicator.

17. A flow indicator comprising a main body adapted for mounting upon a pipe and including a static chamber and a dynamic chamber and a dynamic tube arranged for insertion into the pipe and for fluid connection with the dynamic chamber, an indicating unit, means for connection said unit to the main body, so that it may be adjusted and secured in different axial positions in relation to the main body and also rotated and secured in adjusted position about its own axis, and provision for fluid connection between the indicator and the static and dynamic chambers in any of the adjusted positions of the indicator.

18. A flow indicator comprising a main body adapted for mounting upon a pipe and including a static chamber and a dynamic chamber and a dynamic tube arranged for insertion into the pipe and for fluid connection with the dynamic chamber, an indicating unit, the indicator and the main body having cooperating means for supporting the indicator in at least two different positions upon the main body for adjustable rotation of the indicator about either support, and means connecting the indicator with the static and dynamic chambers in any of its adjusted positions.

19. A flow indicator comprising a main body adapted for mounting upon a pipe and including a static chamber and a dynamic chamber and a dynamic tube arranged for insertion into the pipe and for fluid connection with the dynamic chamber, an indicating unit, the indicator and the main body having cooperating means for supporting the indicator in at least two different positions upon the main body for adjustable rotation of the indicator about either support and for rotative adjustment of an indicator about its own axis in any of the axial positions, and means connecting the indicator with the static and dynamic chambers in any of its adjusted positions.

20. A flow indicator comprising a main body adapted for mounting upon a pipe and including a static chamber and a dynamic chamber and a dynamic tube arranged for insertion into the pipe and for fluid connection with the dynamic chamber, an indicating unit, the main body being provided with at least two indicator supports arranged in different axial relations to the main body, and means for securing the indicator upon either of the supports in various adjusted positions of the indicator axis about the respective supporting axis, and fluid conduits connecting the indicator and said static and dynamic chambers and arranged to accommodate any of the stated indicator adjustments.

21. A flow indicator comprising a main body adapted for mounting upon a pipe and including a static chamber and a dynamic chamber and a dynamic tube arranged for insertion into the pipe and for fluid connection with the dynamic chamber, an indicating unit, the main body being provided with at least two indicator supports arranged in different axial relations to the main body, and means for securing the indicator upon either of the supports in various adjusted positions of the indicator axis about the respective supporting axis, additional means for securing the indicator in various adjusted positions rotatively about its own axis in any of the stated axial positions, and fluid conduits connecting the indicator and said static and dynamic chambers and arranged to accommodate any of the stated indicator adjustments.

22. A flow indicator comprising a main body arranged for connection to a pipe, a dynamic tube in the body arranged to be inserted in the pipe, dynamic and static chambers in the body, an indicator tube, fluid conduits connecting respective ends of the indicator tube with the dynamic and static chambers, valves interposed in the conduits, and means for operating the valves simultaneously to control fluid communication with the tube ends.

23. A flow indicator comprising a main body arranged for connection to a pipe, a dynamic tube in the body arranged to be inserted in the pipe, dynamic and static chambers in the body, an indicator unit arranged for adjustment to various positions in relation to the body and including an indicator tube, fluid conduits connecting respective ends of the indicator tube with the dynamic and static chambers, valves interposed in the conduits, and means for operating the valves simultaneously to control fluid communication with the tube ends.

24. A flow indicator comprising a main body adapted for connection to a pipe, a dynamic tube therein, static and dynamic chambers in the body, an indicator support on the body, an indicator unit mounted for rotative movement of the support and having means for securing it in adjusted position, an index member arranged for rotative movement in relation to the indicator unit and about said support axis, and means for securing the index member in adjusted position in definite relation to the indicator unit.

25. A flow indicator comprising a main body adapted for connection to a pipe, a dynamic tube therein, static and dynamic chambers in the body, an indicator support on the body, an indicator unit mounted for rotative movement on the support and having means for securing it in adjusted position, an index member arranged for rotative movement in relation to the indicator unit and about said support axis, means for securing the index member in adjusted position and a level gauge carried by the index member in definite relation to the indicator unit.

26. A flow indicator comprising a main body adapted for connection to a pipe, a static chamber and a dynamic chamber in the body, a dynamic tube in the body adapted for insertion in the pipe, a spindle extending from one side of the body, an indicator unit having a hub adapted for rotative mounting on the spindle and also having clamping means to secure it in adjusted position, and fluid conduits connecting the dynamic and static chambers to the indicator unit and arranged to accommodate the adjustable positioning of the indicator unit.

27. A flow indicator comprising a main body adapted for connection to a pipe, a static chamber and a dynamic chamber in the body, a dynamic tube in the body adapted for insertion in the pipe, a spindle extending from one side of the body, an indicator unit having a hub adapted for rotative mounting on the spindle and also having clamping means to secure it in adjusted position, and fluid conduits connecting the dynamic and static chambers to the indicator unit and arranged to accommodate the adjustable positioning of the indicator unit, the body having a cylindrical indicator seat coaxial with its main axis and adapted for the selective mounting upon said cylindrical seat and adjustable positioning of the indicator axis rotatively about said seat as a center.

28. A flow indicator comprising a main body adapted for connection to a pipe, a static chamber and a dynamic chamber in the body adapted for insertion into the pipe, a cylindrical indicator seat on the body, an indicator unit having a hub adapted for rotative mounting on said seat and also having clamping means to secure it in adjusted position, the indicator being also arranged for rotative movement on said hub about its own axis, and fluid conduits connecting the dynamic and static chambers to the indicator unit and arranged to accommodate the adjustable positioning of the indicator unit.

In testimony whereof I affix my signature.

LLOYD D. ROYER.